(12) United States Patent
Mateski et al.

(10) Patent No.: US 8,189,487 B1
(45) Date of Patent: May 29, 2012

(54) DETERMINATION OF APPLICATION LATENCY IN A NETWORK NODE

(75) Inventors: Christopher J. Mateski, Overland Park, KS (US); Lyle T. Bertz, Lee's Summit, MO (US); Elizabeth G. Grimbergen, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 177 days.

(21) Appl. No.: 12/510,435

(22) Filed: Jul. 28, 2009

(51) Int. Cl.
*G01R 31/08* (2006.01)

(52) U.S. Cl. ........................ 370/242; 370/252

(58) Field of Classification Search .......... 370/242, 370/243, 244, 245, 248, 252, 389, 392
See application file for complete search history.

(56) References Cited

U.S. PATENT DOCUMENTS

| | | | |
|---|---|---|---|
| 5,812,529 A | 9/1998 | Czarnik et al. | |
| 6,321,264 B1* | 11/2001 | Fletcher et al. | 709/224 |
| 6,363,477 B1* | 3/2002 | Fletcher et al. | 713/151 |
| 6,570,867 B1 | 5/2003 | Robinson et al. | |
| 6,584,491 B1 | 6/2003 | Niemi et al. | |
| 6,697,969 B1 | 2/2004 | Merriam | |
| 7,111,061 B2 | 9/2006 | Leighton et al. | |
| 7,190,190 B1* | 3/2007 | Camarota et al. | 326/38 |
| 7,437,450 B1* | 10/2008 | Gore et al. | 709/224 |
| 7,680,038 B1* | 3/2010 | Gourlay | 370/230 |
| 7,787,438 B2* | 8/2010 | Dowse | 370/350 |
| 2003/0099202 A1 | 5/2003 | Lear et al. | |
| 2004/0052259 A1* | 3/2004 | Garcia et al. | 370/392 |
| 2004/0111510 A1* | 6/2004 | Shoaib et al. | 709/224 |
| 2006/0114911 A1 | 6/2006 | Nguyen | |
| 2007/0025258 A1 | 2/2007 | Chen | |
| 2007/0274227 A1* | 11/2007 | Rauscher et al. | 370/252 |
| 2008/0049633 A1* | 2/2008 | Edwards et al. | 370/252 |
| 2009/0044183 A1* | 2/2009 | Quin et al. | 717/169 |
| 2010/0265832 A1* | 10/2010 | Bajpay et al. | 370/250 |

\* cited by examiner

*Primary Examiner* — Ricky Ngo
*Assistant Examiner* — Christine Ng (57) ABSTRACT

A method of operating a communication system to determine latent applications in a communication network comprises transferring a first packet comprising a first test code to a network node, receiving the first packet in the network node, and in response to the first test code, time stamping the first packet. The method further comprises, in the test server, determining a node latency of the network node based on the time stamps, and if the node latency is greater than a first threshold, then transferring a second packet comprising a second test code to the network node, and in the network node, receiving the second packet, and in response to the second test code, time stamping the second packet. The method further comprises, in the test server, determining an application latency of an application based the time stamps, and if the application latency is greater than a second threshold, then receiving application data associated with the application.

20 Claims, 7 Drawing Sheets

DETERMINATION OF APPLICATION LATENCY IN A NETWORK NODE

TECHNICAL BACKGROUND

Individuals and businesses are becoming increasingly reliant on communication networks to send and receive information. For example, individuals may utilize communication networks for voice communications, research, and entertainment, and organizations typically require the use of high speed data networks such as the Internet for conducting critical business transactions. Since users of communication networks have become dependent on these information services, communication service providers have an interest in ensuring customer satisfaction by providing an optimal speed of data transmissions within the network.

One manner of ensuring communication network transmission speed is to identify and determine network elements that are causing a high latency within the network. For example, a communication network typically includes various nodes, systems, and other network elements in the communication path between one communication device and another. At certain times, some of these network elements may be slow to respond to a network request, or, in a worst-case scenario, completely unresponsive. Therefore, a communication service provider must ensure that a particular network element is not exhibiting a high degree of latency.

OVERVIEW

A method of operating a communication system to determine latent applications in a communication network comprises, in a transmitter, transferring a first packet comprising a first test code to a network node, and in the network node, receiving the first packet, and in response to the first test code, time stamping the first packet resulting in a first timed stamped packet, and transferring the first time stamped packet. The method further comprises, in a receiver, receiving the first time stamped packet and transferring the first time stamped packet to a test server, and in the test server, determining a node latency of the network node based on the first time stamped packet, and if the node latency is greater than a first threshold, then in the transmitter, transferring a second packet comprising a second test code to the network node. The method further comprises, in the network node, receiving the second packet, and in response to the second test code, time stamping the second packet resulting in a second time stamped packet, and transferring the second time stamped packet. Further, the method comprises, in the receiver, receiving the second time stamped packet, and transferring the second time stamped packet to the test server, and in the test server, determining an application latency of an application based on the second time stamped packet, and if the application latency is greater than a second threshold, then receiving application data associated with the application.

A communication system for determining latent applications in a communication network comprises a transmitter, a network node, a receiver, and a test server. The transmitter is configured to transfer a first packet comprising a first test code to the network node. The network node is configured to receive the first packet, and in response to the first test code, time stamp the first packet resulting in a first timed stamped packet, and transfer the first time stamped packet. The receiver is configured to receive the first time stamped packet and transfer the first time stamped packet to the test server. The test server is configured to determine a node latency of the network node based on the first time stamped packet, and if the node latency is greater than a first threshold, then the transmitter is configured to transfer a second packet comprising a second test code to the network node. The network node is configured to receive the second packet, and in response to the second test code, time stamp the second packet resulting in a second time stamped packet, and transfer the second time stamped packet. The receiver is configured to receive the second time stamped packet, and transfer the second time stamped packet to the test server. The test server is configured to determine an application latency of an application based on the second time stamped packet, and if the application latency is greater than a second threshold, then receive application data associated with the application.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
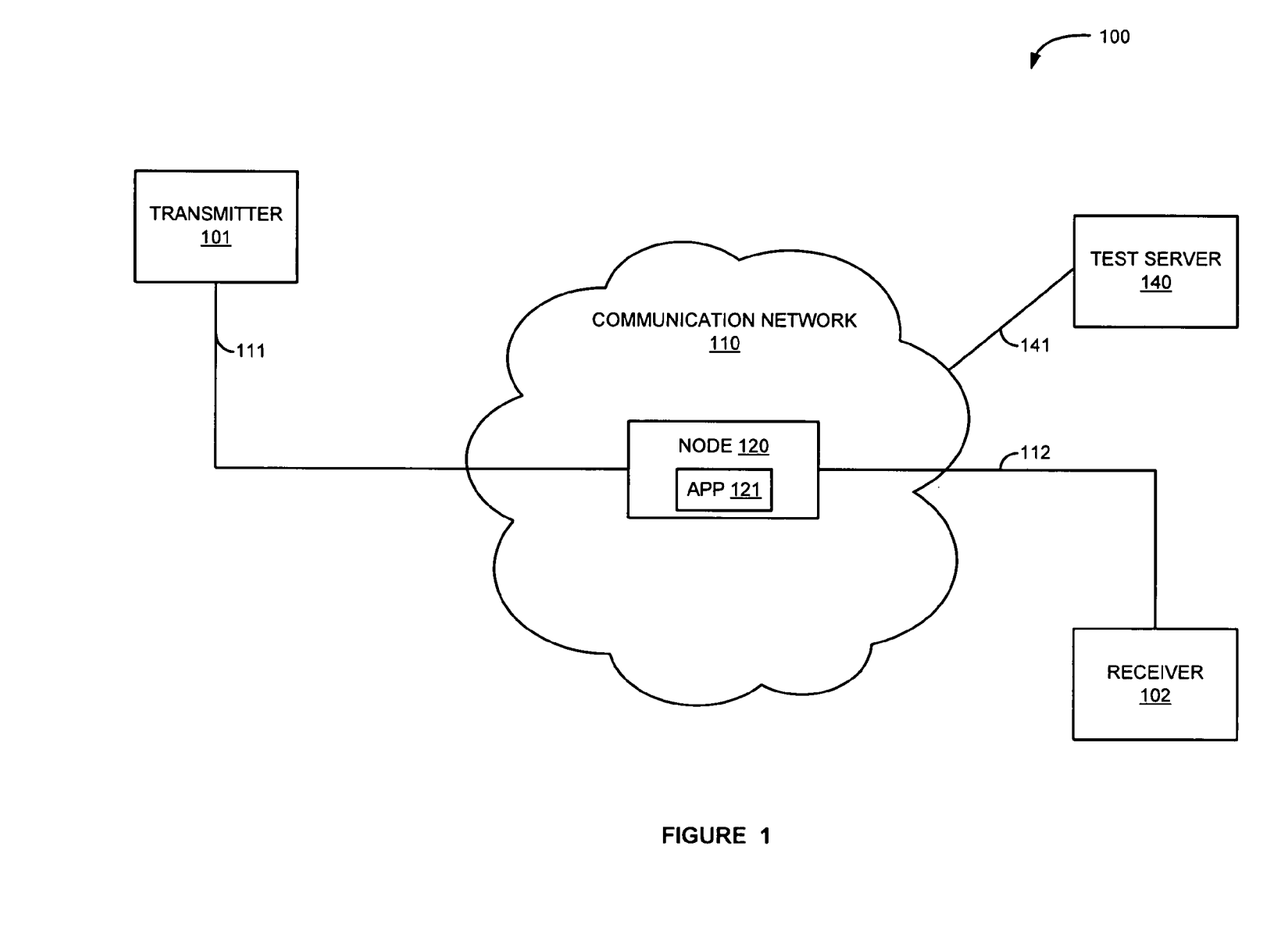
FIG. 1 is a block diagram that illustrates a communication system.

FIG. 1 is a block diagram that illustrates communication system 100. Communication system 100 includes transmitter 101, receiver 102, communication network 110, and test sever 140. Communication network 110 comprises network node 120. Network node 120 includes application 121. Test server 140 is in communication with communication network 110 over communication link 141. Transmitter 101 is in communication with communication network 110 and network node 120 over communication link 111. Likewise, receiver 102 is in communication with communication network 110 and network node 120 over communication link 112.

Figure 2:
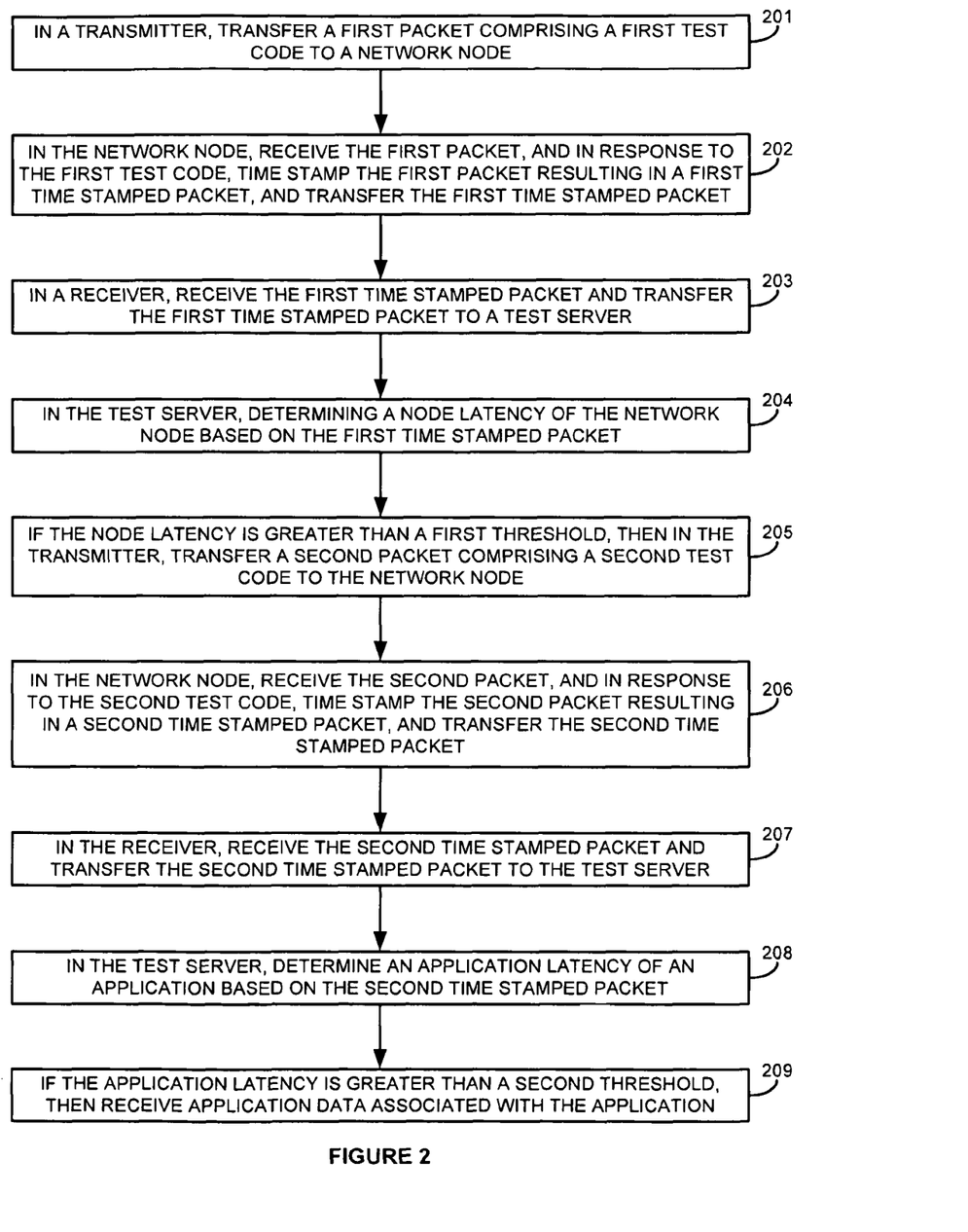
FIG. 2 is a flow diagram that illustrates an operation of the communication system.

FIG. 2 is a flow diagram that illustrates an operation of communication system 100. The steps of the operation are shown parenthetically. To begin, transmitter 101 transfers a first packet comprising a first test code to network node 120 (operation 201). The first test code could be written to a header of the first packet, and instructs network node 120 to time stamp the header of the first packet. For example, the first test code could comprise a single bit, which if set to one, informs node 120 to time stamp the header of first packet.

Network node 120 receives the first packet, and in response to the first test code, time stamps the first packet, resulting in a first time stamped packet, and transfers the first time stamped packet (operation 202). For example, network node 120 could read the header of the first packet to determine if the first test code is present by checking if a single bit representing the first test code is set to one. If network node 120 determines that the bit representing the first test code is set to one, network node 120 may time stamp the header of the first packet with in and out time stamps corresponding to the respective arrival and departure times of the first packet in network node 120. For example, network node 120 could time stamp the first packet by writing a first time stamp to the header of the first packet immediately upon receiving the first packet in node 120, and by writing a second time stamp to the header of the first packet immediately prior to transferring the first time stamped packet. In one embodiment, network node 120 transfers to test server 140 a first packet arrival time corresponding to the first time stamp and a first packet departure time corresponding to the second time stamp. Once network node 120 time stamps the first packet, the first packet is considered a first time stamped packet. Network node 120 could transfer the first time stamped packet to receiver 102, test server 140, another network node, or any other network element in communication with communication network 110.

Receiver 102 receives the first time stamped packet and transfers the first time stamped packet to test server 140 (operation 203). Receiver 102 could receive the first time stamped packet from network node 120 or another network node along the communication path between node 120 and receiver 102. In some embodiments, transmitter 101 is receiver 102, such as in the case of a loop-back test. In other embodiments, test server 140 comprises transmitter 101 and receiver 102.

Test server 140 determines a node latency of network node 120 based on the first time stamped packet (operation 204). For example, test server 140 could determine the node latency of network node 120 by subtracting the first time stamp from the second time stamp. If the node latency is greater than a first threshold, then transmitter 101 transfers a second packet comprising a second test code to network node 120 (operation 205). The first threshold value could be predetermined, and may be calculated dynamically based on an average node latency of all nodes within communication network 110. For example, the first threshold could be calculated as two times the value of the average node latency for all nodes within communication network 110. The second test code of the second packet could be written to a header of the second packet, and instructs network node 120 to time stamp the header of the second packet. For example, the second test code could comprise a single bit, which if set to one, informs node 120 to time stamp the header of second packet. In one example, the second test code instructs network node 120 to time stamp the second packet upon arrival at node 120, immediately prior to processing in application 121, immediately after processing is completed in application 121, and prior to transferring the second packet out of node 120.

Network node 120 receives the second packet, and in response to the second test code, time stamps the second packet resulting in a second time stamped packet, and transfers the second time stamped packet (operation 206). For example, network node 120 could read the header of the second packet to determine if the second test code is present by checking if a single bit representing the second test code is set to one. If network node 120 determines that the bit representing the second test code is set to one, network node 120 may time stamp the header of the second packet with in and out time stamps corresponding to the respective arrival and departure times in network node 120, along with in and out time stamps corresponding to pre- and post-processing in application 121. For example, network node 120 could time stamp the second packet by writing a third time stamp to a header of the second packet immediately prior to processing the second packet in application 121, and writing a fourth time stamp to the header of the second packet immediately after application 121 finishes processing the second packet. Network node 120 could repeat this time stamping for any other applications within node 120. In one embodiment, network node 120 transfers the times corresponding to the time stamps to test server 140. For example, network node 120 could transfer to test server 140 an application pre-processing time corresponding to the third time stamp and an application post-processing time corresponding to the fourth time stamp. Once network node 120 time stamps the second packet, the second packet is considered a second time stamped packet. Network node 120 could transfer the second time stamped packet to receiver 102, test server 140, another network node, or any other network element in communication with communication network 110.

Receiver 102 receives the second time stamped packet and transfers the second time stamped packet to test server 140 (operation 207). Receiver 102 could receive the second time stamped packet from network node 120 or another network node along the communication path between node 120 and receiver 102.

Test server 140 determines an application latency of application 121 based on the second time stamped packet (operation 208). For example, test server 140 could determine the application latency of application 121 by subtracting the third time stamp from the fourth time stamp. If the application latency is greater than a second threshold, then test server 140 receives application data associated with application 121 (operation 209). The second threshold value could be predetermined, and may be calculated dynamically based on an average application latency of all applications of all nodes within communication network 110, or based on an average application latency of the same or similar applications executing on other nodes within communication network 110. For example, the second threshold could be calculated as two times the value of the average application latency for all applications of all nodes within communication network 110.

The application data received by test server 140 could comprise any information associated with application 121 and/or node 120. For example, the application data could comprise contact information associated with an individual responsible for application 121. Test server 140 could then transfer a notification to the individual responsible for the application based on the contact information, such as an electronic mail (email) message, telephone call, Short Message Service (SMS) text message, instant message, or some other notification method. The application data could also comprise a version of application 121, an installation date of application 121, a last reboot date or uptime of node 120 or application 121, a packet address or domain of application 121 or of node 120, information associated with an operating system running on node 120 that executes application 121, error codes associated with the application 121, radio frequency (RF) signal strength of node 120, point-to-point protocol (PPP) errors, a firmware version of node 120 or application 121, or any other information associated with application 121 or node 120.

Advantageously, test server 140 could process the application data to determine a cause of the application latency of application 121. For example, if test server 140 determines that the last reboot date of application 121 exceeds an optimal reboot threshold, test server 140 may determine that the time elapsed since the last reboot date of application 121 is likely causing the application latency, and could instruct network node 120 to reboot node 120 or restart application 121. By performing the operation disclosed above in FIG. 2, test server 140 could identify all nodes in the communication path between transmitter 101 and receiver 102 and their operational status, determine latency between each node, determine latency between each application in each node, and determine round-trip latency. In addition, test server 140 can identify nodes or applications having a longer latency than other nodes or applications in the communication path or in communication network 110, and can flag such nodes or applications for further inspection related to application performance, hardware performance, or compliance with scheduled maintenance, and may determine that a hardware or software upgrade is needed as a result. Test server 140 may also determine which nodes or applications receive the most requests, and the average time for processing the requests, which can aid in determining critical nodes or applications within communication network 110. For example, test server 140 may determine that adding extra capacity or geo-failover is necessary for critical nodes or applications.

Referring back to FIG. 1, transmitter 101 comprises any device or system capable of transferring a packet over communication network 110. Similarly, receiver 102 comprises any device or system capable of receiving a packet over communication network 110. For example, transmitter 101 and receiver 102 could comprise hardware and circuitry programmed to function as a telecommunications device. Transmitter 101 and receiver 102 may comprise a communication interface, user interface, memory device, software, processing circuitry, or some other communication components. For example, transmitter 101 and receiver 102 could comprise a telephone, wireless transceiver, mobile phone, cellular phone, smartphone, computer, personal digital assistant (PDA), e-book, game console, mobile Internet device, network interface card, media player, or some communication apparatus—including combinations thereof.

In one example, transmitter 101 and receiver 102 could comprise wireless communication devices comprising Radio Frequency (RF) communication circuitry and an antenna. The RF communication circuitry typically includes an amplifier, filter, modulator, and signal processing circuitry. Wireless network protocols that may be utilized by transmitter 101 and/or receiver 102 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or some other network protocol—including combinations thereof.

Network node 120 comprises any device or system in the communication path between transmitter 101 and receiver 102 that reads a header of a packet. For example, network node 120 could comprise a server, switch, router, hub, gateway, modem, firewall, computer system, wireless access point, or some other type of communication equipment—including combinations thereof. Network node 120 may also comprise a memory device, software, processing circuitry, cabling, power supply, network communication interface, or some other communication apparatus.

If network node 120 comprises a wireless access point or some other wireless communication equipment, node 120 could include RF communication circuitry and an antenna. The RF communication circuitry typically includes an amplifier, filter, RF modulator, and signal processing circuitry. For example, network node 120 could comprise a base station, Internet access node, telephony service node, wireless data access point, or some other wireless communication system—including combinations thereof. Wireless network protocols that may be utilized by network node 120 include CDMA, GSM, UMTS, HSPA, EV-DO, EV-DO rev. A, 3GPP LTE, WiMAX, Wi-Fi, Internet, telephony, or some other communication format—including combinations thereof.

Network node 120 includes application 121. Application 121 comprises any software or programmed hardware within network node 121 capable of performing an operation associated with a packet received in network node 120. For example, application 121 may read a packet and/or packet header from a buffer or other memory device, process a header and/or payload data of the packet, and may write data to the header and/or payload portions of the packet.

Communication network 110 may comprise any network that provides a communication service for transmitter 101 to send a packet and receiver 102 to receive a packet. Communication network 110 could comprise wireless communication nodes, telephony switches, Internet routers, network gateways, computer systems, communication links, or some other type of communication equipment—including combinations thereof. Communication network 110 may be configured to communicate over metallic, wireless, or optical links. Communication network 110 may be configured to use time-division multiplexing (TDM), Internet Protocol (IP), Ethernet, optical networking, wireless protocols, communication signaling, or some other communication format—including combinations thereof.

Test server 140 comprises a computer system and communication interface. Test server 140 may also include other components such a router, server, data storage system, and power supply. Test server 140 may reside in a single device or may be distributed across multiple devices. Test server 140 may be a discrete system or may be integrated within other systems—including other systems within wireless communication network 100. For example, while test server 140 is shown externally to network node 120, server 140 could be integrated within the components of node 120. Likewise, while test server 140 is shown externally to communication network 110, server 140 could also be integrated within the components of communication network 110. In some embodiments, test server 140 includes transmitter 101 and receiver 102. Test server 140 could comprise a mobile switching center, network gateway system, Internet access node, application server, service node, or some other communication system—including combinations thereof. Test server 140 is in communication with communication network 110 via communication link 141.

Communication links 111, 112, and 141 use metal, air, space, optical fiber such as glass or plastic, or some other signal propagation path—including combinations thereof. Communication links 111, 112, and 141 could use various communication protocols, such as TDM, IP, Ethernet, telephony, optical networking, communication signaling, wireless protocols such as CDMA, GSM, UMTS, HSPA, EV-DO, EV-DO rev. A, 3GPP LTE, WiMAX, Wi-Fi, or some other communication format—including combinations thereof. Communication links 111, 112, and 141 could be direct links or may include various intermediate components, systems, and networks.

Figure 3:
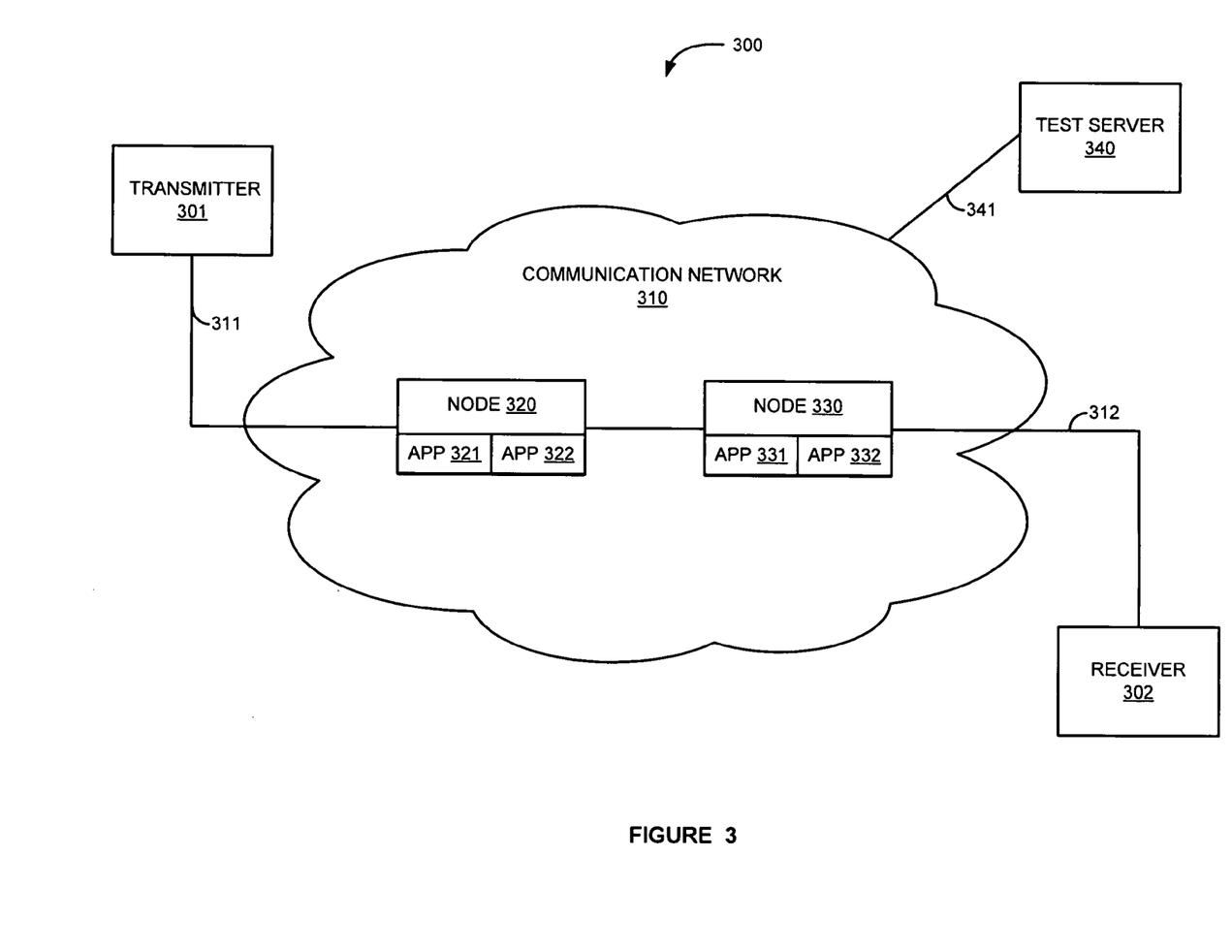
FIG. 3 is a block diagram that illustrates a communication system.

FIG. 3 is a block diagram that illustrates communication system 300. Communication system 300 includes transmitter 301, receiver 302, communication network 310, and test sever 340. Communication network 310 comprises network nodes 320 and 330. Network node 320 includes applications 321 and 322, and network node 330 includes applications 331 and 332. Test server 340 is in communication with communication network 310 over communication link 341. Transmitter 301 is in communication with communication network 310 and network node 320 over communication link 311. Likewise, receiver 302 is in communication with communication network 310 and network node 330 over communication link 312. Network nodes 320 and 330 are in communication with each other.

Figure 4:
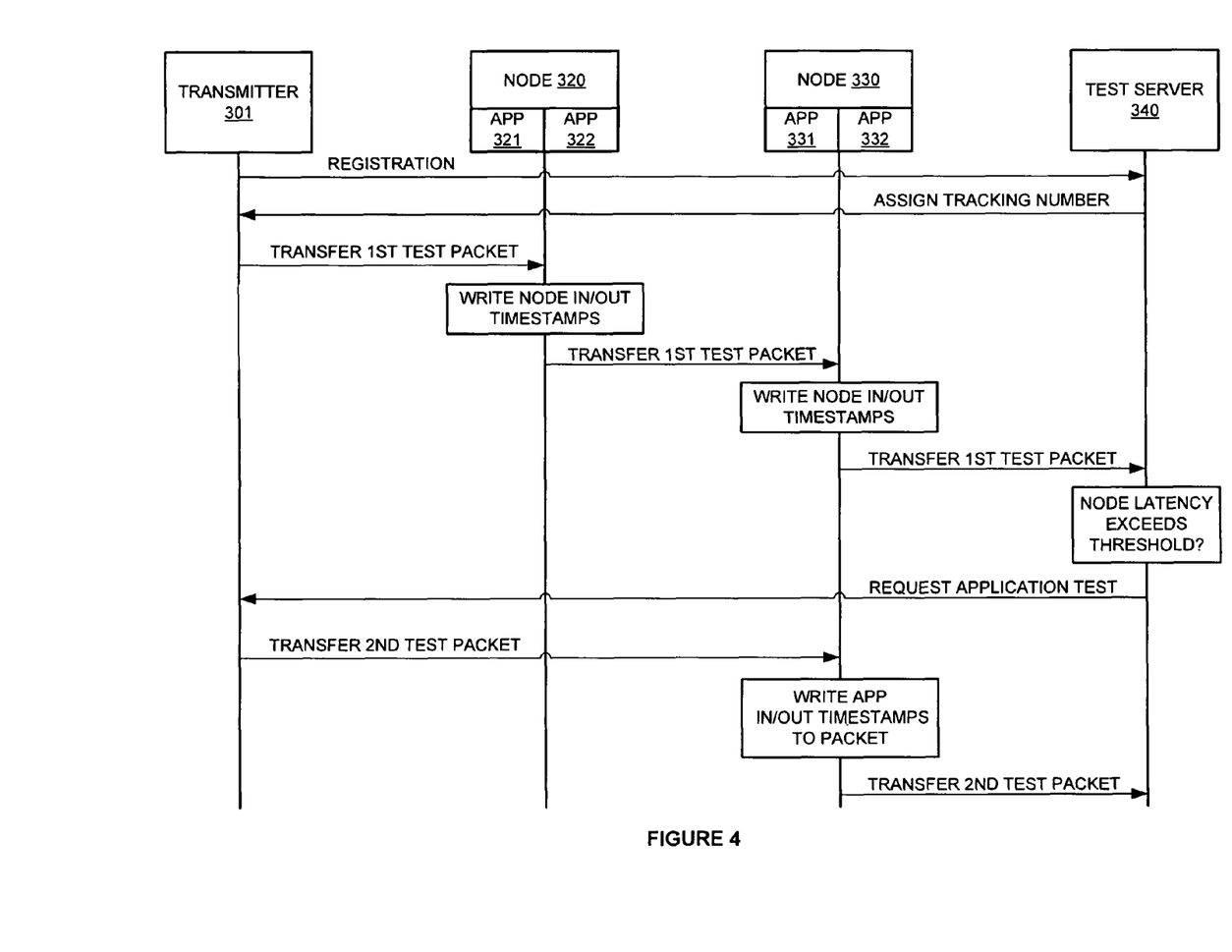
FIG. 4 is a sequence diagram that illustrates an operation of the communication system.

FIG. 4 is a sequence diagram that illustrates an operation of communication system 300. To begin, transmitter 301 generates a work request by registering with the test server. Registration comprises transferring a transmitter identifier such as a telephone number associated with transmitter 301, a packet address, a serial number, such as an Electronic Serial Number (ESN), a Mobile Station Identifier (MSID), a Mobile Equipment Identifier (MEID), an International Mobile Equipment Identity (IMEI), a User Identity Module Identifier (UIMI), or some other identifier that uniquely identifies transmitter 301. The registration request also includes a description of the test to be performed, and may include identification of the node or nodes the test will target. In addition, the registration request may comprise a final destination of the test packets, such as receiver 302 (not shown in FIG. 4). For example, transmitter 301 may be used to test all nodes 320 and 330 in the communication path between transmitter 301 and receiver 302. However, the test could also target a specific node by transferring a packet directly to that node, such as by sending a test packet directly to an IP or Media Access Control (MAC) address associated with the target node, for example. One skilled in the art will understand that there may be many more nodes in the communication path between transmitter 301 and receiver 302 than the two nodes 320 and 330 shown in communication system 300 of FIG. 3.

Test server 340 receives the registration information from transmitter 301 and assigns a unique tracking number for the requested test. The unique tracking number allows test server 340 to keep track of the particular test. Transmitter 301 receives the tracking number and prepares a test packet for transmission. Transmitter 301 prepares the first test packet by setting an "in-packet" flag in the header of the packet, writing a first test code to the packer header, and writing the unique tracking number to the packet header. The test code informs network nodes 320 and 330 that the packet is a test packet, and the "in-packet" flag instructs network nodes 320 and 330 to write in/out time stamps to the packet header. In some embodiments, transmitter 301 also writes a Uniform Resource Locator (URL), packet address, or some other address associated with test server 340 to the packet header. The payload area of the test packet may contain any data, or may be empty. In one alternative embodiment, instead of the packet header, the payload area of the test packet could be used to store the "in-packet" flag, test code, unique tracking number, URL of test server 340, or other information to be read by the nodes 320 and 330 and/or the test server 340.

After preparing the first test packet, transmitter 301 transfers the first test packet to node 320. Node 320 reads the packet header to determine whether it contains a test code. Since transmitter 301 wrote a test code to the packet header, node 320 determines that a test packet has been received. The test code in the first test packet instructs the nodes to record the arrival and departure times of the packet, and the "in-packet" flag instructs network nodes 320 and 330 to write these in/out time stamps to the packet header. In some embodiments, nodes 320 and 330 may also calculate the in/out latency as well. Since the "in-packet" flag has been set by transmitter 301, test server writes the in/out time stamps and/or the in/out latency to the header of the first test packet. Optionally, if transmitter 301 provided the URL of test server 340, node 320 may use this information to register with test server 340 and transfer the node in/out time stamps and/or node in/out latency to test server 340 (not shown). After node 320 writes the in and out time stamps to the header, node 320 transfers the first test packet to node 330.

Node 330 processes the first test packet in the same manner as described above for node 320. Thus, after node 330 writes the node in/out timestamps and/or node in/out latency to the header of the first test packet, node 330 transfers the first test packet to test server 340 using the URL supplied by transmitter 301. However, note that in alternative embodiments, the first test packet may be transferred to test server 340 via receiver 302.

Test server 340 receives the first test packet, and determines whether the node latency in either of nodes 320 or 330 exceeds a threshold. If test server 340 determines that the node latency in either of nodes 320 or 330 exceeds the threshold value, test server 340 requests an application test to test the latency of the applications executing within the latent node. In FIG. 4, test server 340 has determined that the node latency of node 330 exceeds the threshold, so test server 340 transfers an application test request to transmitter 301 to test the latency of all applications 331 and 332 within node 330.

Transmitter 301 receives the request to test the applications within node 330, and prepares a second test packet. The second test packet is prepared in the same manner as described above for the first test packet, except that transmitter 301 writes a second test code to the packet header. The second test code informs network node 330 that the packet is a test packet, and that a full test of node 330 and all applications 331 and 332 on node 330 is requested. Transmitter then needs to ensure that the second test packet is only processed by node 330. This may be accomplished by transferring the packet directly to an address associated with node 330, or by sending the second test packet to another device in the communication path of transmitter 301 and node 330, such as receiver 302 (not shown in FIG. 4). In this case, the second test code could instruct only node 330 to perform the second test by including a packet address, MAC address, or other identifier associated with node 330 in the test code.

Node 330 receives the second test packet and determines that the packet contains the second test code. The second test code instructs node 330 to note the arrival time of the second test packet at node 330, immediately prior to processing in each application 331 and 332, immediately after processing is completed in each application 331 and 332, and prior to transferring the second packet out of node 330. In the operation of FIG. 4, transmitter 301 set the "in-packet" flag in the second test packet, so node 330 writes all of the above time stamps and/or latencies to the header of the second test packet. Node 330 then transfers the second test packet to test server 340 using the URL supplied by transmitter 301. In alternative embodiments, the second test packet may be transferred to test server 340 via receiver 302.

Test server 340 receives the second test packet and determines whether the application latency of either application 331 or 332 exceeds a second threshold. If test server 340 determines that the latency of application 331 or 332 exceeds the second threshold, test server 340 retrieves application data associated with the latent application. The application data received by test server 340 could comprise any information associated with the application or the node 330 on which the application is executing. Using the application data, test server 340 can determine a likely cause of the latency in the application, and inform a person in charge of the application or node of the latency problem and the likely cause.

Figure 5:
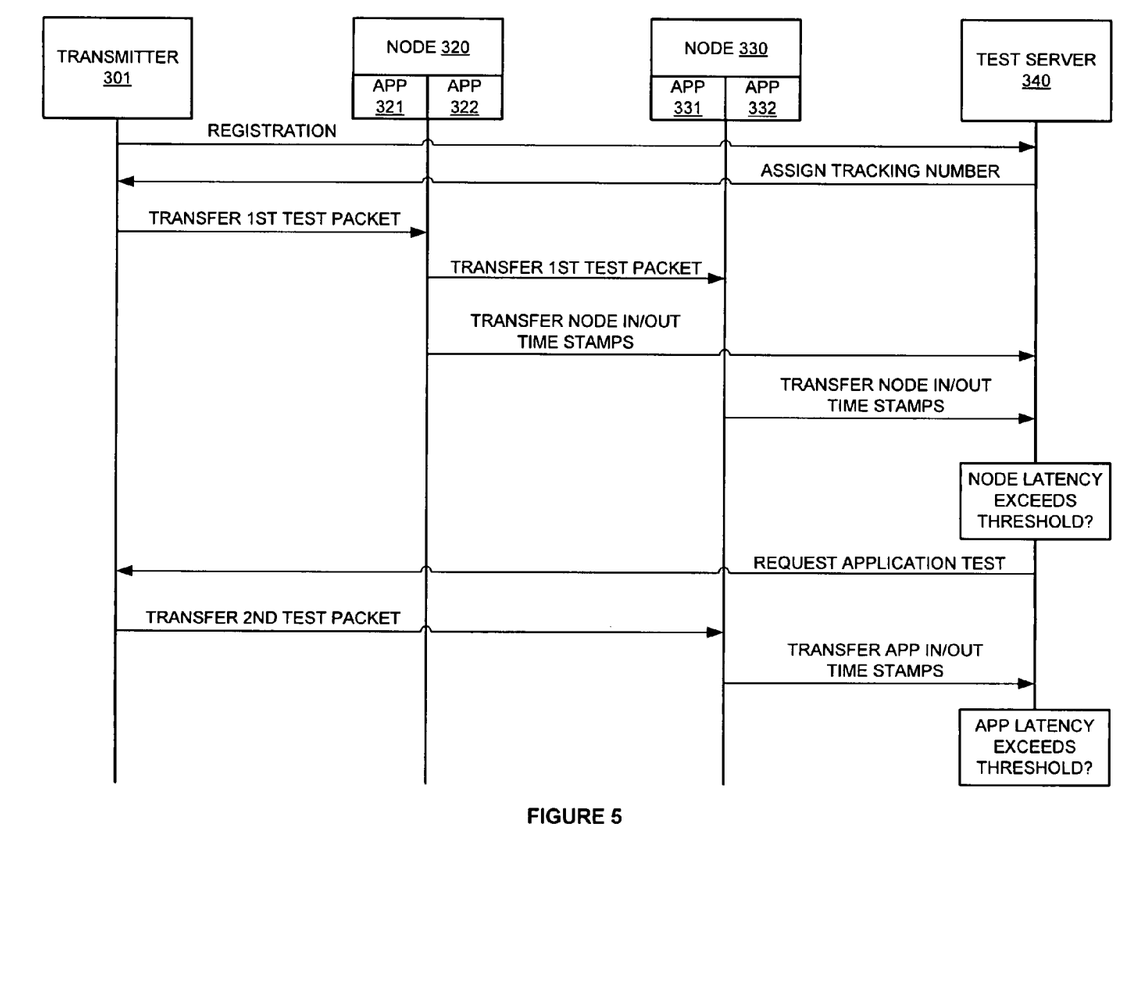
FIG. 5 is a sequence diagram that illustrates an operation of the communication system.

FIG. 5 is a sequence diagram that illustrates an operation of communication system 300. The operation shown in FIG. 5 is similar to the operation of FIG. 4, except that in FIG. 5, transmitter 301 does not set the "in-packet" flag. Thus, after transmitter 301 registers with test server 340 and receives the tracking number, transmitter 301 prepares the first test packet by writing a first test code to the packer header, writing the unique tracking number to the packet header, and writing a Uniform Resource Locator (URL), packet address, or some other address associated with test server 340 to the packet header.

After preparing the first test packet, transmitter 301 transfers the first test packet to node 320. Node 320 processes the packet header and determines that a test packet has been received. The test code in the first test packet instructs node 320 to record the arrival and departure times of the packet, and the lack of the "in-packet" flag and/or the presence of the URL of test server 340 instructs node 320 that these packet in/out times and/or latencies must be sent to test server 340. Node 320 therefore records these times and transfers this information to test server 340 using the URL supplied by transmitter 301.

Node 320 transfers the first test packet to node 330 and node 330 processes the first test packet in the same manner as described above for node 320. Thus, node 330 records the packet in/out times and/or latencies and transfers this information to test server 340 using the URL supplied by transmitter 301.

Test server 340 receives the first test packet and determines whether the node latency in either of nodes 320 or 330 exceeds a threshold. In FIG. 5, test server 340 has determined that the node latency of node 330 exceeds a threshold, so test server 340 transfers an application test request to transmitter 301 to test the latency of all applications 331 and 332 within node 330.

Transmitter 301 receives the request to test the applications within node 330, and prepares a second test packet. The second test packet is prepared in the same manner as described above for the first test packet, except that transmitter 301 writes a second test code to the packet header. The second test code informs network node 330 that the packet is a test packet, and that a full test of node 330 and all applications 331 and 332 on node 330 is requested. After the second test packet is prepared, transmitter 301 transfers the second test packet to node 330.

Node 330 receives the second test packet and determines that the packet contains the second test code. The second test code instructs node 330 to note the arrival time of the second test packet at node 330, immediately prior to processing in each application 331 and 332, immediately after processing is completed in each application 331 and 332, and prior to transferring the second packet out of node 330. Thus, node 330 transfers the above information to test server 340 using the URL supplied by transmitter 301.

Test server 340 receives the second test packet and determines whether the application latency of either application 331 or 332 exceeds a threshold. If test server 340 determines that the latency of application 331 or 332 exceeds a threshold, test server 340 retrieves application data associated with the latent application. The application data received by test server 340 could comprise any information associated with the application or the node 330 on which the application is executing. Using the application data, test server 340 can determine a likely cause of the latency in the application, and inform a person in charge of the application or node of the latency problem and the likely cause.

Figure 6:
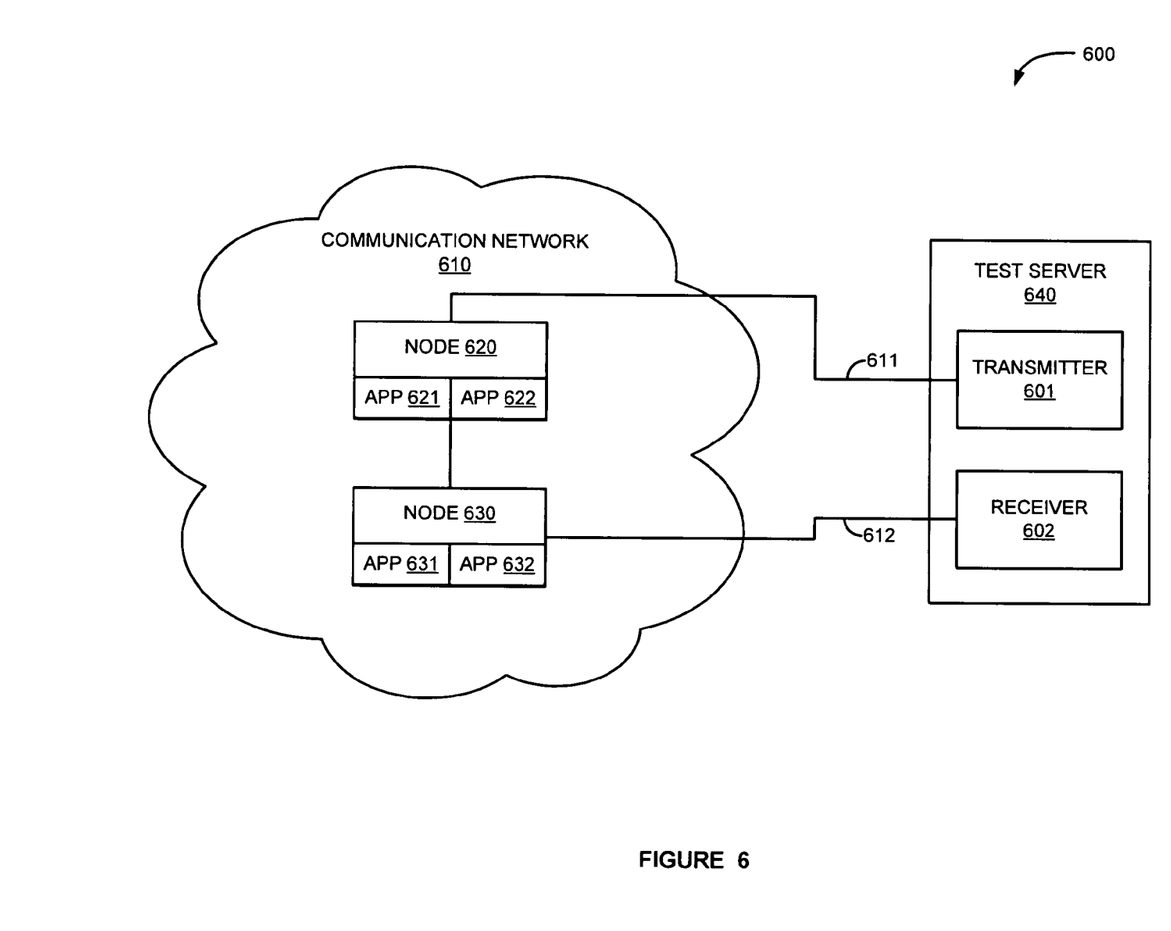
FIG. 6 is a block diagram that illustrates a communication system.

FIG. 6 is a block diagram that illustrates communication system 600. Communication system 600 comprises communication network 610 and test sever 640. Communication network 610 comprises network nodes 620 and 630. Network node 620 includes applications 621 and 622, and network node 630 includes applications 631 and 632. Test server 640 includes transmitter 601 and receiver 602. Test server 640 and transmitter 601 are in communication with communication network 610, node 620, and node 630 over communication link 611. Likewise, test server 640 and receiver 602 are in communication with communication network 610, node 620, and node 630 over communication link 612. Network nodes 620 and 630 are in communication with each other.

Communication system 600 provides an alternative embodiment wherein the transmitter 601 and receiver 602 are implemented within test server 640 as either programmed hardware and/or software modules executing on test server 640. By including transmitter 601 and receiver 602 within test server 640, all tests are initiated by test server 640 and utilize the communication links 611 and 612 to transfer test packets to nodes 620 and 630. Thus, the registration and tracking number assignment steps shown in the operations of FIGS. 4 and 5 are not necessary when running tests using communication system 600. Test server 640 could prepare a test packet for transmission to nodes 620 and 630 by assigning a tracking number for the test and writing the tracking number and test code to the packet header, and could also write optional data such as the "in-packet" flag or URL of test server 640 to the packet header. Test server 640 could then instruct transmitter 601 to transfer the packet to nodes 620 and 630 for latency testing.

While the transmitter 601 and receiver 602 are shown separately, transmitter 601 and receiver 602 could be a single software module or programmed hardware device capable of both transmitting and receiving data packets. Likewise, while transmitter 601 and receiver 602 are depicted as utilizing separate communication links 611 and 612, links 611 and 612 could be the same communication link. In this case, a single transmitter/receiver utilizing a single communication link in communication with nodes 620 and 630 could perform the entire test run by both transferring a test packet to the nodes and receiving a time stamped packet and/or the in/out times from the nodes 620 and 630. One example of such a test scenario is a loop-back test. In another alternative embodiment, the test server could be included within a transmitter or a receiver (not shown).

Figure 7:
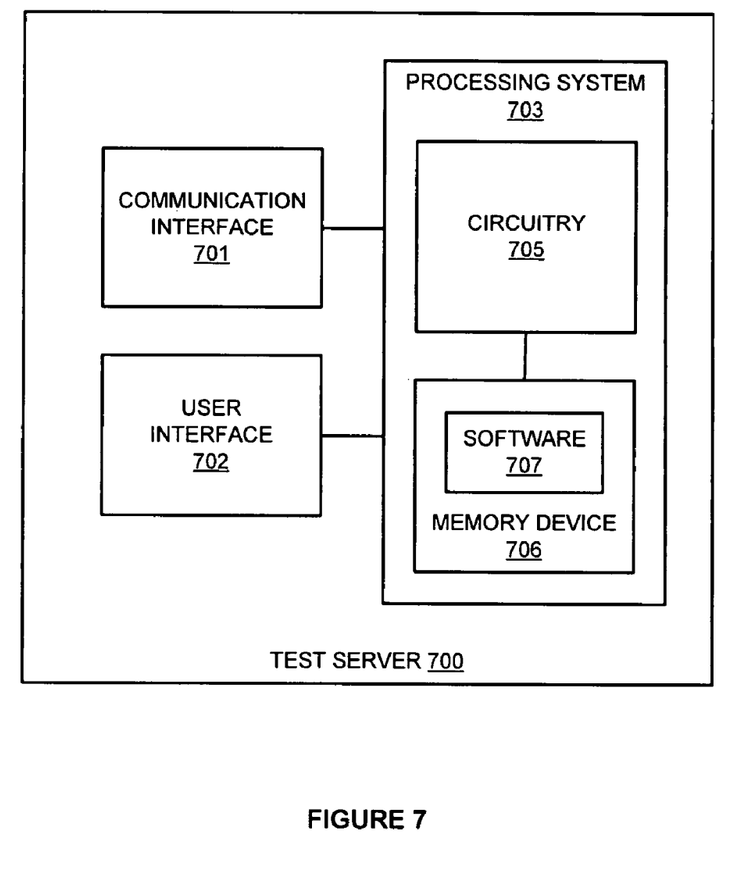
FIG. 7 is a block diagram that illustrates a test server.

FIG. 7 is a block diagram that illustrates test server 700. Test server 700 provides an example of test servers 140, 340, and 640, although servers 140, 340, and 640 may use alternative configurations. Test server 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use time-division multiplexing (TDM), Internet Protocol (IP), Ethernet, optical networking, wireless protocols, communication signaling, or some other communication format—including combinations thereof. Communication interface 701 is capable of sending and receiving packets.

User interface 702 comprises components that interact with a user. User interface 702 may include a keyboard, display screen, mouse, touch pad, touch screen, or some other user input/output apparatus. User interface 702 may be omitted in some examples.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate test server 700 as described herein. In particular, operating software 707 directs processing system 703 to determine a node latency of a network node based on a first time stamped packet. If processing system 703 determines that the node latency is greater than a first threshold, then operating software 707 could direct processing system 703 to utilize communication interface 701 to transfer a request to a transmitter to test the latency of the applications within the network node. In addition, operating software 707 directs processing system 703 to determine an application latency of an application based on a second time stamped packet. If processing system 703 determines that the application latency is greater than a second threshold, then operating software 707 directs processing system 703 to utilize communication interface 701 to receive application data associated with the application.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to determine latent applications in a communication network, the method comprising:
in a transmitter, transferring a first packet comprising a first test code to a network node;
in the network node, receiving the first packet, and in response to the first test code, time stamping the first packet resulting in a first timed stamped packet, and transferring the first time stamped packet;
in a receiver, receiving the first time stamped packet and transferring the first time stamped packet to a test server;
in the test server, determining a node latency of the network node based on the first time stamped packet;
if the node latency is greater than a first threshold, then in the transmitter, transferring a second packet comprising a second test code to the network node;
in the network node, receiving the second packet, and in response to the second test code, time stamping the second packet resulting in a second time stamped packet, and transferring the second time stamped packet;
in the receiver, receiving the second time stamped packet, and transferring the second time stamped packet to the test server;
in the test server, determining an application latency of an application based on the second time stamped packet;
if the application latency is greater than a second threshold, then receiving application data associated with the application.

2. The method of claim 1 wherein time stamping the first packet comprises writing a first time stamp to a header of the first packet upon receiving the first packet in the network node, and writing a second time stamp to the header of the first packet immediately prior to transferring the first time stamped packet.

3. The method of claim 1 wherein time stamping the second packet comprises writing a third time stamp to a header of the second packet immediately prior to processing the second packet in the application, and writing a fourth time stamp to the header of the second packet immediately after the application finishes processing the second packet.

4. The method of claim 3 wherein determining the application latency of the application based on the second time stamped packet comprises subtracting the third time stamp from the fourth time stamp.

5. The method of claim 1 wherein the application data comprises contact information associated with an individual responsible for the application.

6. The method of claim 5 further comprising transferring a notification to the individual responsible for the application based on the contact information.

7. The method of claim 1 further comprising processing the application data to determine a cause of the application latency.

8. The method of claim 1 wherein the application data comprises a version of the application.

9. The method of claim 1 wherein the application data comprises an installation date of the application.

10. The method of claim 1 wherein the application data comprises a last reboot date of the application.

11. A communication system for determining latent applications in a communication network, the system comprising:
a transmitter configured to transfer a first packet comprising a first test code to a network node;
the network node configured to receive the first packet, and in response to the first test code, time stamp the first packet resulting in a first timed stamped packet, and transfer the first time stamped packet;
a receiver configured to receive the first time stamped packet and transfer the first time stamped packet to a test server;
the test server configured to determine a node latency of the network node based on the first time stamped packet;
if the node latency is greater than a first threshold, then the transmitter configured to transfer a second packet comprising a second test code to the network node;
the network node configured to receive the second packet, and in response to the second test code, time stamp the second packet resulting in a second time stamped packet, and transfer the second time stamped packet;
the receiver configured to receive the second time stamped packet, and transfer the second time stamped packet to the test server;
the test server configured to determine an application latency of an application based on the second time stamped packet, and if the application latency is greater than a second threshold, then receive application data associated with the application.

12. The system of claim 11 wherein the network node, to time stamp the first packet, writes a first time stamp to a header of the first packet upon receiving the first packet in the network node, and writes a second time stamp to the header of the first packet immediately prior to transferring the first time stamped packet.

13. The system of claim 11 wherein the network node, to time stamp the second packet, writes a third time stamp to a header of the second packet immediately prior to processing the second packet in the application, and writes a fourth time stamp to the header of the second packet immediately after the application finishes processing the second packet.

14. The system of claim 13 wherein the test server, to determine the application latency of the application based on the second time stamped packet, subtracts the third time stamp from the fourth time stamp.

15. The system of claim 11 wherein the application data comprises contact information associated with an individual responsible for the application.

16. The system of claim 15 wherein the test server is further configured to transfer a notification to the individual responsible for the application based on the contact information.

17. The system of claim 11 wherein the test server is further configured to process the application data to determine a cause of the application latency.

18. The system of claim 11 wherein the application data comprises a version of the application.

19. The system of claim 11 wherein the application data comprises an installation date of the application.

20. The system of claim 11 wherein the application data comprises a last reboot date of the application.

* * * * *